US00RE42628E

(19) United States
(12) Reissued Patent
Aperfine et al.

(10) Patent Number: US RE42,628 E
(45) Date of Reissued Patent: Aug. 23, 2011

(54) THERMOCHROMIC WATER PROOF APPAREL

(75) Inventors: Lauren M. Aperfine, Summerfield, NC (US); Debra B. Aperfine, Summerfield, NC (US)

(73) Assignee: Debra B. Aperfine, Summerfield, NC (US)

(21) Appl. No.: 12/022,848

(22) Filed: Jan. 30, 2008

Related U.S. Patent Documents

Reissue of:
(64) Patent No.: 6,990,688
Issued: Jan. 31, 2006
Appl. No.: 10/452,403
Filed: Jun. 2, 2003

(51) Int. Cl.
*A41D 13/00* (2006.01)

(52) U.S. Cl. ..... 2/82

(58) Field of Classification Search ..... 2/69, 455, 2/102, 108, 79, 227, 456, 2.15, 82; 428/315.9, 428/313.9; 502/204, 206
See application file for complete search history.

(56) References Cited

U.S. PATENT DOCUMENTS

| | | | | |
|---|---|---|---|---|
| 4,028,118 | A * | 6/1977 | Nakasuji et al. | 106/31.19 |
| 4,032,687 | A * | 6/1977 | Hornsby, Jr. | 428/1.61 |
| 4,142,782 | A * | 3/1979 | O'Brian | 359/288 |
| 4,421,560 | A | 12/1983 | Kito et al. | |
| 4,642,250 | A | 2/1987 | Spector | |
| 4,826,550 | A | 5/1989 | Shimizu et al. | |
| 5,085,607 | A | 2/1992 | Shibahashi | |
| 5,197,958 | A * | 3/1993 | Howell | 604/361 |
| 5,352,649 | A | 10/1994 | Shibahashi et al. | |
| 5,688,592 | A | 11/1997 | Shibahashi et al. | |
| 5,730,908 | A * | 3/1998 | Nodari et al. | 252/586 |
| 5,798,404 | A | 8/1998 | Monty | |
| 5,919,404 | A | 7/1999 | Fujita et al. | |
| 6,188,506 | B1 * | 2/2001 | Kaiserman et al. | 359/288 |
| 6,228,804 | B1 * | 5/2001 | Nakashima | 503/226 |
| 6,416,853 | B1 * | 7/2002 | Nakashima et al. | 428/313.9 |
| 6,470,891 | B2 * | 10/2002 | Carroll | 128/897 |
| 6,500,555 | B1 * | 12/2002 | Khaldi | 428/457 |
| 6,594,927 | B2 * | 7/2003 | Witkowski | 40/310 |
| 6,752,430 | B2 * | 6/2004 | Holt et al. | 283/72 |
| 6,841,244 | B2 * | 1/2005 | Foss et al. | 428/370 |
| 6,990,688 | B2 * | 1/2006 | Aperfine et al. | 2/82 |
| 7,674,747 | B1 * | 3/2010 | Long | 503/201 |

FOREIGN PATENT DOCUMENTS

CA 2066978 A1 6/1996

(Continued)

OTHER PUBLICATIONS

Notice of Reasons of Refusal from Japanese Patent Office, Nov. 11, 2009, 4 pp.

(Continued)

*Primary Examiner* — Tejash Patel
(74) *Attorney, Agent, or Firm* — Verrill Dana, LLP; Chris A. Caseiro

(57) ABSTRACT

Waterproof apparel constructed of a flexible PVC sheet or other polymeric flexible sheet material that changes color due to a change in ambient conditions. Thermochromic dyes and/or photochromatic dyes are incorporated into the resin mix for fabricating the flexible sheet material. The color of the waterproof apparel changes when the temperature rises above or drops below a pre-defined temperature and/or when the ultra-violet light level is above or below a pre-defined level.

34 Claims, 1 Drawing Sheet

FOREIGN PATENT DOCUMENTS

| | | | |
|---|---|---|---|
| EP | 0564959 | A | 10/1993 |
| EP | 1243687 | A | 9/2002 |
| GB | 2208348 | A | 3/1989 |
| JP | H07-119056 | A | 5/1995 |
| JP | H07-165762 | A | 6/1995 |
| JP | 2003-073904 | A | 3/2003 |

OTHER PUBLICATIONS

Supplementary European Search Report from European Patent Office, Mar. 26, 2007, 2 pp.

* cited by examiner

THERMOCHROMIC WATER PROOF APPAREL

Matter enclosed in heavy brackets [ ] appears in the original patent but forms no part of this reissue specification; matter printed in italics indicates the additions made by reissue.

BACKGROUND INFORMATION

1. Field of the Invention

The field of the invention relates to waterproof outerwear. More particularly, the invention relates to waterproof outerwear made of flexible sheet material, such as elastomeric PVC, polyurethane elastomer, or other thermoplastic alloys, that changes its appearance as the ambient temperature changes.

2. Description of the Prior Art

Conventional waterproof apparel, which includes raincoats or jackets, rain hats, rain pants and footwear, is generally constructed of a waterproof material. The types of material used for such waterproof apparel include woven and non-woven material, material that is inherently waterproof, such as PVC or other polymeric extruded or calendered sheet material, as well as woven cotton material that is surface-treated with a waterproofing coating.

Essentially, the purpose of waterproof apparel is to protect the wearer from the external elements. Many types of material are already known that satisfy this purpose adequately. It is also important that waterproof apparel be comfortable to wear and aethetically pleasing and it is in this area that waterproof apparel is often less than satisfactory, particularly for children. Children often refuse to wear traditional waterproof apparel because it is found to be cumbersome and unappealing. Thus, children are often exposed to undesirable weather elements without benefit of protective clothing.

It is, therefore, desirable to provide waterproof apparel that provides an entertaining and surprising effect that is appealing to children. One such entertaining and surprising effect is to provide for a color change in the fabric of the waterproof apparel, depending on the temperature or on sunshine. It is know to effect a change in the color of a material by the use of thermochromic dyes or inks.

Thermochromic dyes allow a reversible color change as a function of temperature change. For instance, a thermochromic dye incorporated into a material appears transparent until the material reaches a certain temperature, at which time, due to an electron exchange, the color pigment of the thermochromic dye is released from encapsulation and the material takes on the color of the pigment. Thermochromic materials can be formulated to "change" color when the temperature rises above or falls below a predefined temperature.

Thermochromic dyes and their use in PVC sheet material are known. The Pilot Ink Co. teaches thermochromic dyes and methods of incorporating them into plastic materials. See, for example, Nakasuji et al. (U.S. Pat. No. 4,028,118; 1977) and Kito, et al (U.S. Pat. No. 4,421,560; 1983), which disclose thermochromic sheets comprising a thermochromic layer containing thermochromic material that is laminated onto a backing material. By using a suitable technique, such as adding the thermochromic material to a polymeric substance, the resulting mixture is then made into a film that can be heat pressed onto the backing material. A protective layer is laminated onto the thermochromic layer to make it weather resistant. The protective layer may be a film of polyvinyl chloride (PVC). These patents are herein incorporated by reference.

Shibahashi et al. (U.S. Pat. No. 5,858,914; 1999) discloses applying thermochromic-dye-containing images to a boot. The boot appears to be a uniform, solid color at room temperature, for example, but when the temperature drops below a pre-defined temperature, the images then become apparent. Doolan (U.S. Pat. No. 6,196,241; 2001) discloses an umbrella having a canopy onto which thermochromic-dye-containing images have been applied. When the temperature of the umbrella fabric drops because of the cooling effect of the rain, the images become visible on the canopy. None of the prior art, however, discloses waterproof apparel that is made of a flexible fabric and that incorporates thermochromic properties and/or ultraviolet-sensitive properties.

What is needed therefore is waterproof apparel that provides adequate protection against the elements of the weather, but that is, at the same time, comfortable to wear. What is further needed is such apparel that is aethetically appealing to the wearer. What is yet further needed is such waterproof apparel that is particularly appealing and entertaining to children.

BRIEF SUMMARY OF THE INVENTION

For the reasons cited above, it is an object of the invention to provide waterproof apparel that provides protection against rain and is comfortable to wear. It is a further object of the invention to provide such apparel that is aesthetically appealing to the wearer. It is a yet further object to provide such apparel that is particularly appealing and entertaining to children.

The above-cited objects are achieved by providing waterproof apparel that is visually appealing and engages the interest and pleasure of the wearer by providing a change in appearance as a function of ambient conditions. The waterproof apparel according to the invention is constructed of flexible PVC film that contains thermochromic properties such that, when the temperature of the waterproof apparel changes beyond a set limit temperature, the waterproof apparel changes appearance.

The change in appearance of the waterproof apparel is effected by incorporating one or more thermochromic substances, such as pigments or dyes into PVC resin that is extruded, calendered, or cast into sheet material for use in the fabric for the waterproof apparel. Such thermochromic substances are hereinafter referred to simply as thermochromic dyes. The thermochromic dye remains transparent within a certain temperature range, but, when the ambient temperature, and thus, also the temperature of the waterproof apparel, changes beyond a pre-defined limit, the dye then becomes visible. The ability to visibly see the change in ambient temperature provides a fun and surprising experience for the wearer of the waterproof apparel.

The waterproof apparel according to the invention is constructed of flexible PVC material that includes at least one thermochromic dye. For example, a raincoat that is pink at room temperature changes to purple when the temperature of the PVC material drops below 62 degrees F.

It is within the scope of the invention to include more than one dye in the material, so that various effects are obtainable. So, for example, the pink raincoat described above changes to another color, say a cool blue, when the temperature rises above 68 degrees F. It is also possible to incorporate a second thermochromic dye within the PVC resin to be extruded such that a variegated pattern appears on the apparel. The variegated patterns include moiré effects, stripes, or random appearances of one or more colors that provide a "mottled" effect.

Dyes that are sensitive to ultraviolet light, i.e., photochromatic dyes, are known and it is within the scope of the invention to provide waterproof apparel that includes photochromatic properties, along with the thermochromic properties described above. Thus, a raincoat according to the invention changes color when the temperature rises above or falls below pre-defined limit temperatures, but also changes color when the ultra-violet light level rises above or falls below predefined limits.

The waterproof apparel according to the invention includes coats, jackets, pants, hats, skirts, boots or shoes, shoe coverings, shoulder bags, tote bags, and backpacks.

DETAILED DESCRIPTION OF THE INVENTION

In the preferred embodiment of the invention, the batch material for fabricating a flexible PVC sheet material includes the polyvinyl chloride polymer and/or copolymer resin, compounded with plasticizers as needed to provide a supple sheet suitable for waterproof apparel, and one or more thermochromic dyes. The thermochromic dyes are conventional dyes, such as dyes provided by Keystone Aniline Dyes. The dyes are added to the batch material in the form of microencapsulated particles, in which they appear transparent, i.e., are invisible, as long as the ambient temperature remains within a base temperature range. When the temperature exceeds a pre-defined limit, the dye is released from the encapsulation and now becomes visible. This process of releasing the particles of dye is reversible, as taught by the Pilot Ink Co. patents mentioned above, so that when the temperature reverts back to the base temperature range, the dye is again encapsulated and becomes, again, invisible.

Figure 1:
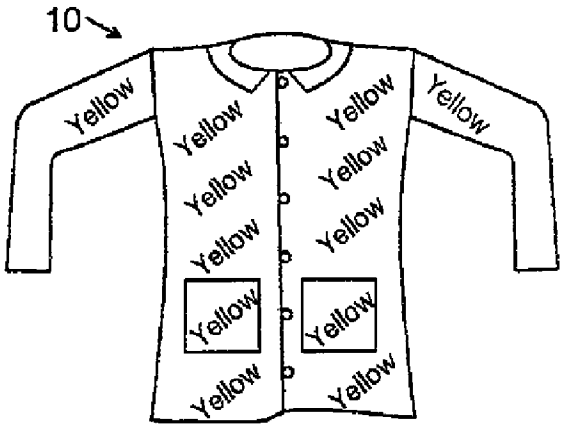
FIG. 1 illustrates a raincoat have a color at room temperature.
Figure 2:
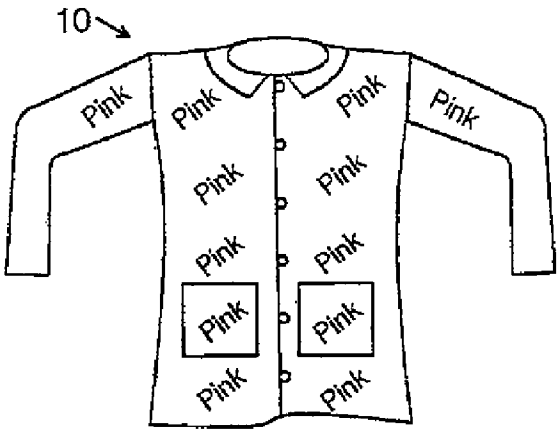
FIG. 2 illustrates the raincoat of FIG. 1, having changed its color due to a change in ambient temperature beyond a predefined temperature limit.

FIGS. 1 and 2 show a first embodiment of a waterproof apparel 10 according to the invention. The waterproof apparel 10, in this particular illustration a coat, is constructed of a flexible, PVC sheet material containing a thermochromic dye that is co-extruded with the PVC sheet material. FIG. 1 shows the waterproof apparel 10 at room temperature, having a first solid color 3 at room temperature. FIG. 2 shows the waterproof apparel 10 having a second solid color 5 after the temperature has dropped below a predefined temperature limit, such as 65 degrees Fahrenheit. It should be understood that specific temperature limits given herein are arbitrary and for purposes of illustration, and that the scope of the invention includes temperature limits within the range of possible limits of conventional thermochromic dyes and/or inks.

In a second embodiment, the waterproof apparel 10 is constructed of a flexible thermochromic PVC sheet material that includes a first thermochromic dye that becomes apparent at a first temperature change limit and a second thermochromic dye that becomes apparent at a second temperature change limit. For example, the flexible PVC sheet material has a base color of yellow. When the temperature drops below 65 degrees Fahrenheit, the color of the sheet material changes to blue; when the temperature rises above 72 degrees Fahrenheit, the color changes to green. It is understood that many variations of the present invention are possible, using numerous thermochromic dyes and choosing any number of feasible temperature limits.

Figure 3:
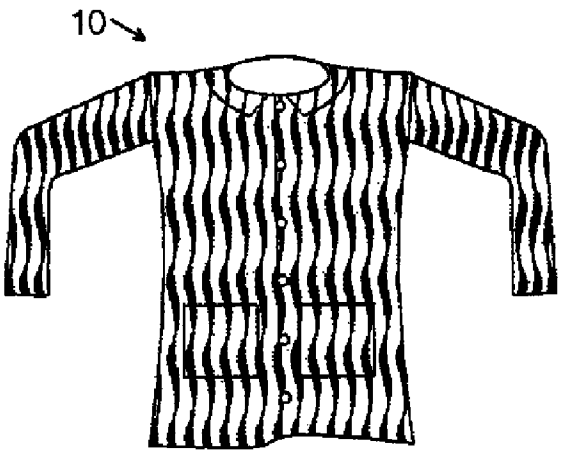
FIG. 3 illustrates the raincoat of FIG. 1 evidencing a moiré effect created by the simultaneous activation of two or more thermochromic dyes.
Figure 4:
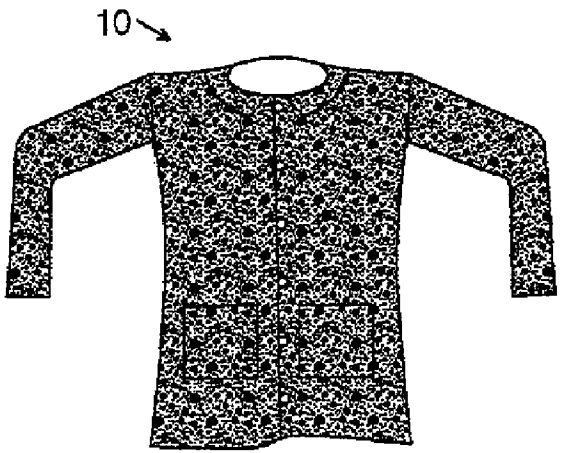
FIG. 4 illustrates the raincoat of FIG. 1 evidencing a mottled effect created by the simultaneous activation of multiple thermochromic dyes.

FIGS. 3 and 4 illustrate variations of the waterproof apparel 10, depending on how the thermochromic dyes are incorporated into the PVC base material and how many colors are used. FIG. 3 shows the waterproof apparel 10 that evidences a moiré effect when the temperature changes beyond the predefined temperature limit. Rather than mixing the thermochromic dyes in with the PVC resin, the dyes are injected into the extrusion process through a series of nozzles or injectors, thereby creating a striped and/or wavy pattern in the PVC material. FIG. 4 illustrates another variation in which multiple colors are incorporated into the base material in a random pattern, creating the mottled effect with the ambient temperature rises above or falls below the respective temperature limit.

Analogous to the art of incorporating thermochromic dyes into PVC flexible sheet material, photochromatic dyes, that is, dyes that are sensitive to ultra-violet light (UV), may also be included as microencapsulated particles into the batch material for fabricating the PVC sheet material, whether it be by extrusion, calendering, or coating processes, such as curtain, solution, or roller. Thus, the PVC fabric for the waterproof apparel 10 may include photochromatic dyes, either alone or in combination with thermochromic dyes. It is within the scope of the invention to provide waterproof apparel 12 that is made of a flexible PVC or other elastomeric polymer fabric that changes color as a function of the amount of ambient UV light. If the sky is overcast, the waterproof apparel 12 evidences a base color. When the sun comes out, the color of the waterproof apparel changes to a second color. It is within the scope of the invention to provide waterproof apparel that includes a combination of thermochromic dyes and photochromatic dyes.

The material used for the waterproof apparel 10 preferably has a supple drape to it and feels comfortable against the skin of a wearer. For this reason, additives or a backing may be applied to the flexible PVC or other polymeric material to provide a feel to the waterproof apparel 10 that is akin to a woven fabric. Nylon is a suitable additive and a suitable backing material may be made of olefin polymers, copolymers, or terpolymers.

The embodiments of the invention mentioned herein are merely illustrative of the present invention. It should be understood that a person skilled in the art may contemplate many variations in construction of the present invention in view of the following claims without straying from the intended scope and field of the invention herein disclosed.

What is claimed is:

1. Waterproof apparel comprising a sheet material that evidences a change in color in response to an ambient condition, wherein said sheet material is a flexible PVC material containing an ambient-condition-dependent color-changing additive that is incorporated into a PVC resin compound for fabricating said flexible PVC material.

2. The waterproof apparel of claim 1, wherein said ambient-condition-dependent color-changing additive is a thermochromic dye and said ambient condition that effects said change in color is an ambient temperature range, wherein said ambient temperature range includes a base temperature range and a thermochromic temperature range, and wherein said sheet material evidences a base color within said base temperature range and a thermochromic color within said thermochromic temperature range.

3. The waterproof apparel of claim 2, wherein said thermochromic dye includes more than one thermochromic dye and said sheet material evidences a first thermochromic color with a first thermochromic temperature range and at least a second thermochromic color within a second thermochromic temperature range.

4. The waterproof apparel of claim 2, wherein said thermochromic dye includes more than one thermochromic dye and said sheet material evidences a thermochromic color scheme that includes said more than one thermochromic dye.

5. The waterproof apparel of claim 1, wherein said ambient-condition-dependent color-changing additive is a photochromatic dye and said ambient condition that effects said change in color is an ambient ultra-violet light (UV) range, wherein said ambient UV light range includes a base UV light range and a second UV light range, and wherein said sheet material evidences a base color within said base UV light range and a second color within said second UV light range.

6. The waterproof apparel of claim 5, wherein said photochromatic dye includes more than one photochromatic dye and said sheet material evidences a first ultra-violet-light-dependent color within a first UV light range and at least a second ultra-violet-light-dependent color within a second UV light range.

7. The waterproof apparel of claim 1, wherein said ambient-condition-dependent color-changing additive includes a combination of a thermochromic dye and a photochromatic dye.

8. The waterproof apparel of claim 1 comprising a coat.

9. The waterproof apparel of claim 1 comprising a hat.

10. The waterproof apparel of claim 1 comprising a jacket.

11. The waterproof apparel of claim 1 comprising pants.

12. The waterproof apparel of claim 1 comprising a tote bag.

13. The waterproof apparel of claim 1 comprising a backpack.

14. The waterproof apparel of claim 1 comprising a shoulder bag.

15. The waterproof apparel of claim 1 comprising boots.

16. The waterproof apparel of claim 1 comprising a protective shoe covering.

17. The waterproof apparel of claim 1 comprising an umbrella.

18. The waterproof apparel of claim 1, wherein said sheet material includes non-PVC polymers, copolymers, terpolymers, alloys, and an ambient-condition-dependent color-changing additive which is compounded in said sheet material.

19. The waterproof apparel of claim 1, wherein said sheet material is supported on a backing fabric.

20. The waterproof apparel of claim 1, wherein said thermochromic temperature range is lower than said base temperature range so as to effect a color change when said ambient condition cools an ambient temperature below that of said thermochromic temperature range.

*21. A waterproof sheet material that evidences a change in color in response to an ambient condition, the waterproof sheet material comprising:*

*a. a polymeric compound formed into a single layer flexible sheet, the polymeric compound having waterproofing characteristics; and*

*b. an ambient-condition-dependent color-changing additive that is incorporated into said polymeric compound and wherein only the ambient-condition-dependent color-changing additive effects the change in color of the waterproof sheet material.*

*22. The waterproof sheet material of claim 21, wherein said ambient-condition-dependent color-changing additive is a thermochromic dye and said ambient condition that effects said change in color is an ambient temperature range, wherein said ambient temperature range includes a base temperature range and a thermochromic temperature range, and wherein the waterproof sheet material evidences a base color within said base temperature range and a thermochromic color within said thermochromic temperature range.*

*23. The waterproof sheet material of claim 22, wherein said thermochromic dye includes more than one thermochromic dye and the waterproof sheet material evidences a first thermochromic color with a first thermochromic temperature range and at least a second thermochromic color within a second thermochromic temperature range.*

*24. The waterproof sheet material of claim 21, wherein said ambient-condition-dependent color-changing additive is a photochromatic dye and said ambient condition that effects said change in color is an ultra-violet (UV) light range, wherein said ambient UV light range includes a base UV light range and a second UV light range, and wherein said sheet material evidences a base color within said base UV light range and a second color within said second UV light range.*

*25. The waterproof sheet material of claim 24, wherein said photochromatic dye includes more than one photochromatic dye and the waterproof sheet material evidences a first ultra-violet-light-dependent color within a first UV light range and at least a second ultra-violet-light-dependent color within a second UV light range.*

*26. The waterproof sheet material of claim 21, wherein said ambient-condition-dependent color-changing additive includes a combination of a thermochromic dye and a photochromatic dye.*

*27. The waterproof sheet material of claim 21, wherein said polymeric compound is selected from the group consisting of one or more of: PVC polymers, non-PVC polymers, copolymers, terpolymers, and polymer alloys.*

*28. The waterproof sheet material of claim 22, wherein said thermochromic temperature range is lower than said base temperature range so as to effect a color change when said ambient condition cools an ambient temperature below that of said thermochromic temperature range.*

*29. The waterproof sheet material of claim 21, wherein the ambient-condition-dependent color-changing additive is formed as a plurality of microencapsulated particles distributed through the polymeric compound.*

*30. Waterproof apparel comprising a sheet material that evidences a change in color in response to an ambient condition, wherein said sheet material is a flexible material containing an ambient-condition-dependent color-changing additive that is incorporated into a polymeric compound for fabricating said flexible sheet material and wherein said polymeric compound is selected from the group consisting of one or more of: PVC polymers, non-PVC polymers, copolymers, terpolymers, and polymer alloys.*

*31. The waterproof apparel of claim 30, wherein said ambient-condition-dependent color-changing additive is a thermochromic dye and said ambient condition that effects said change in color is an ambient temperature range, wherein said ambient temperature range includes a base temperature range and a thermochromic temperature range, and wherein said sheet material evidences a base color within said base temperature range and a thermochromic color within said thermochromic temperature range.*

*32. The waterproof apparel of claim 30, wherein said ambient-condition-dependent color-changing additive is a photochromatic dye and said ambient condition that effects said change in color is an ambient ultra-violet light (UV) range, wherein said ambient UV light range includes a base UV light range and a second UV light range, and wherein said sheet material evidences a base color within said base UV light range and a second color within said second UV light range.*

*33. A waterproof sheet material that evidences a change in color in response to an ambient condition, the waterproof sheet material comprising:*

*a. a polymeric compound suitable for forming into a flexible sheet, the polymeric compound having waterproofing characteristics; and*

*b. a plurality of thermochromic dyes incorporated into said polymeric compound for fabricating the waterproof sheet material as a single layer and wherein only the plurality of thermochromic dyes effect the change in color of the waterproof sheet material, wherein the waterproof sheet material evidences a first thermochromic color within a first thermochromic temperature range and at least a second thermochromic color within a second thermochromic temperature range.*

*34. A waterproof sheet material that evidences a change in color in response to an ambient condition, the waterproof sheet material comprising:*

*a. a polymeric compound suitable for forming into a flexible sheet, the polymeric compound having waterproofing characteristics; and*

*b. a photochromatic dye incorporated into said polymeric compound for fabricating the waterproof sheet material as a single layer, wherein only the photochromatic dye effects the change in color of the waterproof sheet material, wherein the ambient condition that effects said change in color is an ultra-violet (UV) light range, wherein said ambient UV light range includes a base UV light range and a second UV light range, and wherein said sheet material evidences a base color within said base UV light range and a second color within said second UV light range.*

* * * * *